United States Patent [19]

Blankenship

[11] Patent Number: 4,823,408
[45] Date of Patent: Apr. 25, 1989

[54] INCINERATOR TOILET WITH HUMPBACK CATALYST CONTAINER

[75] Inventor: Ernest B. Blankenship, Dallas, Tex.

[73] Assignee: Research Products/Blankenship Corporation, Dallas, Tex.

[21] Appl. No.: 160,525

[22] Filed: Feb. 26, 1988

[51] Int. Cl.⁴ .............................................. A47K 11/02
[52] U.S. Cl. ....................................... 4/111.5; 110/250
[58] Field of Search .................. 4/111.1, 111.2, 111.5; 110/250

[56] References Cited

U.S. PATENT DOCUMENTS

3,943,579 3/1976 Blankenship ......................... 4/111.5

Primary Examiner—Henry J. Recla
Assistant Examiner—Robert Fetsuga
Attorney, Agent, or Firm—Arthur F. Zobal

[57] ABSTRACT

The incinerator toilet has an incinerator chamber with an opening formed therethrough in which is located an electrical heating coil. A bowl is located above the chamber and a removable pan located below the chamber. The chamber is formed by inner and outer walls with a catalyst container being integral therewith and extending radially outward to an increased depth. A heat activated catalyst is located in the catalyst chamber and perforations are formed through the inner and outer walls of the catalyst chamber. A collection chamber is located outwardly of the catalyst chamber and has a lower outlet to which is coupled an exhaust device for drawing gases from the incinerator chamber through the heat activated catalyst and collection chamber. A baffle is located in the collection chamber and is coupled to its lower wall and extends upward to a position above the outlet of the collection chamber. A top wall is secured above the catalyst chamber and the collection chamber and has an opening with a removable lid in fluid communication with both the catalyst chamber and the collection chamber.

5 Claims, 5 Drawing Sheets

INCINERATOR TOILET WITH HUMPBACK CATALYST CONTAINER

BACKGROUND OF THE INVENTION

U.S. Pat. No. 3,943,579 discloses a container for a heat activated catalyst located between the intake of an exhaust blower and an incineration chamber. Fumes and gases generated during incineration are drawn through the catalyst which, if heated sufficiently, causes a chemical breakdown of the odor molecules, thereby preventing odor from entering the ventline. If, however, the catalyst has not reached its operative temperature, the odor is unaffected and creates an unacceptable nuisance.

Although the incinerator toilet disclosed in U.S. Pat. No. 3,943,579 has advantages, a few problem areas have developed. The catalyst container disclosed in the patent is located outside the incineration chamber, away from a direct source of heat, depending rather upon transferal of heat from the heated fumes as they pass through the catalyst. Unfortunately, the first gases passing through the catalyst also carry odor; hence, the odor passes through the cold catalyst into the ventline as odor and continues to do so until the catalyst reaches its operating temperature some several minutes later.

A secondary problem is that associated with condensation of moisture within the catalyst container unless higher temperatures, on the order of 200° F., are reached. Condensation results in the accumulation of moisture underneath the canister.

To circumvent these problems the catalyst container was made an integral part of the incinerator, becoming a section of the double incinerator wall, having a portion of the wall perforated both front and back with a section of the annulus between the walls being filled with catalyst and heated directly by exposure to the inner heater of the incineration chamber. Flow of gases and fumes through the catalyst was induced by the low pressure of the intake orifice of a downstream exhaust blower, collection of these gases immediately in the rear of the perforated section being accomplished by a manifold covering the perforated area. The catalyst chamber had a thickness of approximately $\frac{3}{8}$"; a height of about 3 $\frac{1}{4}$"; and the arc of its inner wall was about 10" such that it had a total volume of 22 cu. in., approximately, for holding the heat activated catalyst. It also had a collection chamber with a depth of about $\frac{1}{4}$" with an exhaust port with a diameter of about 1 $\frac{1}{4}$" located near the bottom of the outer wall of the collection chamber leading to the blower intake.

Efficiency of the catalyst is, among other things, a function of its volume, i.e., upon the dwell-time of the odor molecule. If the molecule is drawn through too rapidly, the time for the reaction is too short; therefore, if the thickness is small, then the areal extent must be large to provide the same volume or dwell-time within the catalyst. For the case immediately above, a large area of catalyst was provided as well as a correspondingly large collection chamber. However, the collection chamber was relieved at the other side by an orifice of only 1 $\frac{1}{4}$" within a distance of $\frac{1}{4}$" from the outer face of the catalyst and this close proximity created an uneven distribution of pressure across face of the catalyst inducing more rapid flow immediately across from the exit orifice and lesser flow through areas farther removed from the orifice—effectively reducing the active or participating catalyst section. In short, the total area of the catalyst had to be enlarged by virtue of the small ratio of exhaust area to the total area of collection face due to the irregular distribution of pressure across the catalyst face.

Since the thickness of the catalyst bed was precisely that of the inside of the double incinerator wall, no provision could be made for the occasional replacement of replenishment of the catalyst. The catalyst used is activated alumina in the form of pellets approximately $\frac{1}{8}$" diameter, very friable, hence subject to mechanical erosion, i.e., powdering, under the action of contraction and expansion of the inner incinerator wall due to heating and cooling. As the powder is generated, the effective volume of the catalyst shrinks, leaving a gap at the top of the catalyst allowing raw odor to pass through the blower and into the ventline.

A further consequence of the powder development is that of packing, i.e., powder closes off porosity of the catalyst, reducing flow-through and, hence, the effective volume or, with constant flow, reducing dwell-time of odor molecules within the catalyst. Even more damaging is the concentration of powder to the extent of becoming incompressible which causes the inner wall to deform when expanding, causing ultimate wall failure.

Finally, the powder is drawn into the blower, some of which adheres to the blower impeller causing imbalance and excessive vibration.

SUMMARY OF THE INVENTION

It is an object of the invention to provide an incinerator toilet having an incinerator chamber which overcomes the problems mentioned above.

The incinerator chamber has a catalyst container or chamber which is an integral part of the wall of the incinerator chamber. The inner wall of the incinerator chamber has a section which is perforated and which forms the inner wall of the catalyst chamber. The outer perforated wall of the catalyst chamber is coupled to the outer wall of the incinerator chamber and extends radially outward therefrom to increase the thickness of the catalyst chamber and hence the bed of the catalyst therein. This allows the volume of the catalyst to be increased while the areal extent of the catalyst bed, facing the heater on one side and the blower exhaust on the other, to be reduced.

The outer wall of the collection chamber is coupled to the outer wall of the catalyst chamber and has an outlet through which gases are withdrawn by the evacuator means. A baffle is coupled to the bottom of the collection chamber and extends upward between its two side walls to a height below the top wall thereof and above the collection chamber outlet. This causes the flow path from the catalyst chamber to the collection chamber outlet to extend upward over the baffle before passing to the collection chamber outlet, thereby causing dust to drop out and be collected in the bottom in front of the baffle thereby preventing the passage of dust to the blower and depositing on the blower impeller.

The top of the incinerator chamber has an opening leading to the catalyst chamber and to the collection chamber with a removable cover. By removing the cover, old or deteriorated catalyst can be vacuumed out through the opening and new catalyst added.

DETAILED DESCRIPTION OF THE INVENTION

Figure 1:
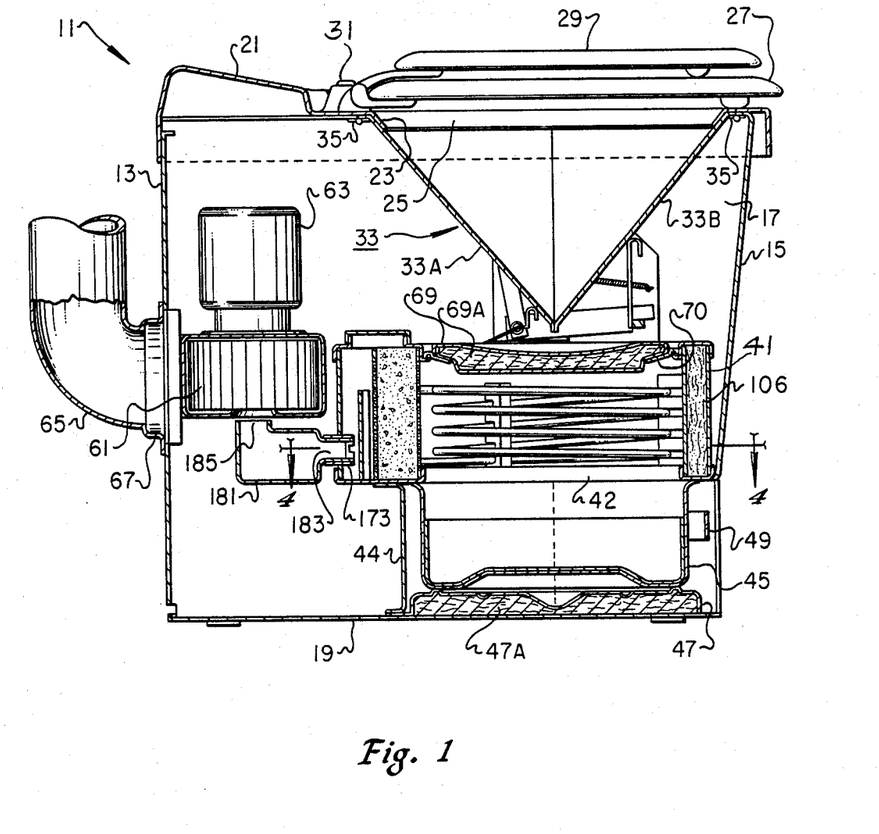
FIG. 1 is a cross sectional side view of the incinerator toilet of the invention.

Referring to FIG. 1, the incinerator toilet comprises a housing 11 formed by a rear wall 13, a front wall 15, two side walls, one of which is identified at 17, a bottom wall 19, and a top 21. The front, rear, sides, and bottom walls and the top 21 are preferably formed of mild steel. The forward portion of the top 21 includes a recessed upper bowl portion 23 forming an upper opening 25 which extends downward from the top 21. Located above and around the bowl 23 is a hinged seat 27 adapted to be located in the position shown or moved to an upward position. A hinged lid 29 is adapted to fit over the seat 27. The lid 29 also may be moved to an upward position independently of the seat. The seat 27 and the lid 29 are hinged to the top 21 by way of a hinge arrangement illustrated at 31. A lower bowl portion 33 is located below the upper bowl portion 23 and is transversely divided into two halves 33A and 33B which are pivotally mounted to the underside of the top 21 by way of hinges 35. When the toilet is being used, the halves 33A and 33B will be in their closed position whereby a cone-shaped paper insert may be located within the lower bowl portion 33.

The incinerator toilet comprises an open ended incinerator chamber member 41 located below the bowl and which has a circular electrical heating coil 43 located in its central opening 42. The chamber member 41 is mounted on a semi-circular metal support 44. An ash pan 45 is slideably mounted on a metal step support 47 formed on the housing bottom 19 within the chamber support 44 and below the central opening 42 of the chamber member 41. Heat insulation materials 47A is located between the support 47 and the bottom 19. The ash pan 45 has a handle 49 on its front side which is accessible by means of a removable panel (not shown) but which will be located below the front wall 15. A blower wheel 61 and a motor 63 are provided for drawing gases from the interior of the chamber 41 and the pan 45 and then through a heat activated odor reducing catalyst 81 and then out of a rear vent 65 which is connected to the rear wall 13 of the housing by way of a collar 67. An incinerator chamber lid 69, which fits into a recessed seat 70 formed at the upper end of the chamber 41, is provided for closing the upper end of the chamber 41 while the heater coil 43 is being energized for disposing of the waste received in the pan 45. The outer walls of the lid 69 are formed of stainless steel with heat insulation material 69A located within the walls.

When the incinerator toilet is being used by a person, the lower bowl halves 33A and 33B will be located in their closed position as shown in FIG. 1 and a cone-shaped paper insert located within the lower bowl portion 33. When it is desired to deposit the waste in the paper cone within the pan 45, the chamber lid 69 will be raised upward and out of its recessed seat and then swung to the side and out of the way to allow the hinged halves 33A and 33B to swing open to allow the paper cone and the waste to drop through the central opening 42 of the chamber 41 and into the pan 45. A linkage mechanism controlled by a foot pedal suitable for allowing the bowl halves 33A and 33B and the chamber lid 69 to operate in this manner is disclosed in my U.S. Pat. No. 3,890,653, granted on June 24, 1975, and entitled "Incinerator Toilet Having a Vertically Movable Incinerator Chamber Lid". After the paper cone and waste have been deposited in the pan 45, the foot pedal again will be actuated to return the chamber lid 69 to its closed position and to return the bowl halves 33A and 33B to their closed positions. A switch then may be actuated to complete a circuit to the electrical coil 43 and to the blower motor 63. A timer is set thereby causing the heater and exhaust blower to come into operation, staying on until the incinerator process and cooling process are completed. Gases from the chamber 41 are drawn through the heat activated catalyst 81 for reducing the odor and then through the ventline 65. Residual ash is collected in the removable ash pan 45. Suitable electrical circuits for electrically controlling the coil 43 and the blower motor 63 are disclosed in U.S. Pat. No. 3,020,559, granted on Feb. 13, 1962, and U.S. Pat. No. 3,251,070, granted on May 17, 1966.

Figure 4:
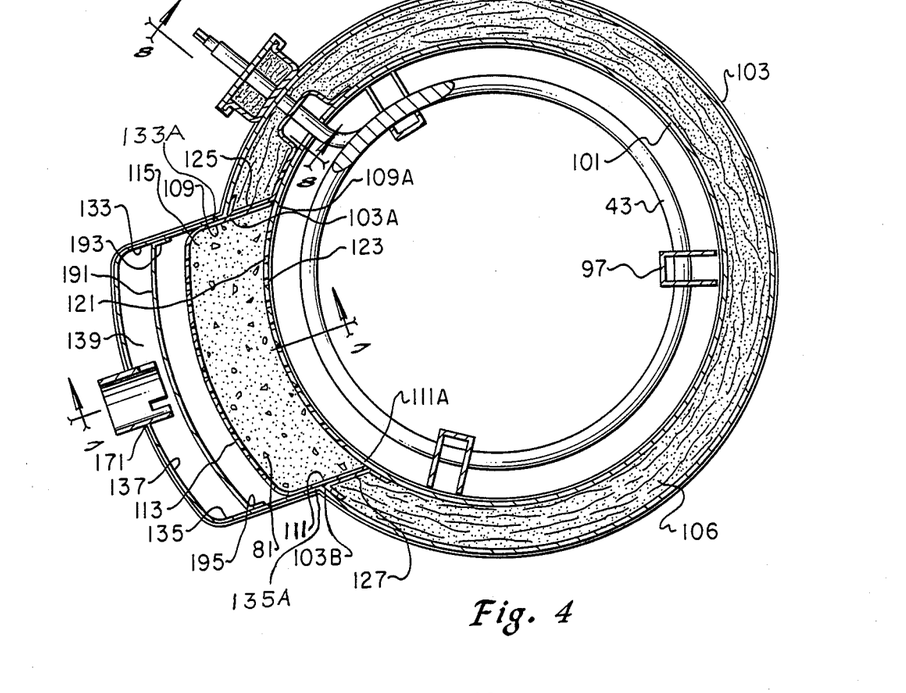
FIG. 4 is a cross section of FIG. 1 taken along the lines 4—4 thereof.

Referring now to FIGS. 1, 2, 4, and 7, the incinerator chamber member 41 is formed by a cylindrical shaped inner side wall 101 and a partially cylindrical shaped outer side wall 103 spaced from and partially surrounding the inner side wall 101 forming a partially annular heat insulation holding space 105 therebetween. The heat insulation 106 is illustrated in FIGS. 1 and 4. A U-shaped outer catalyst chamber side wall 107 is coupled to the inner wall 101 and to the outer wall 103 for forming a catalyst chamber or container 109. The U-shaped member 107 has two legs 109 and 111 and an arcuate portion 113 having a radius greater than the radius of the wall 103. The edges 109A and 111A of the legs 109 and 111 are connected to the outer surface of the cylindrical member 101 and the outer sides of the legs 109 and 111 are connected to the edges 103A and 103B of the partially cylindrical shaped member 103 with the arcuate portion 113 extending outward beyond the outer wall 103 on one side of the diameter of the wall 103 forming a catalyst chamber 115 for receiving a heat activated odor reducing catalyst 81. Perforations 121 are formed through the arcuate portion 113 of the U-shaped member 107 and perforations 123 are formed through the cylindrical shaped inner wall 101 between the edges 109A and 111A of the legs of the U-shaped member 107. U-shaped brackets 125 and 127 are secured against the outside of the legs 109 and 111 and to the outside and the inside of the wall members 101 and 103 whereby the heat insulation chamber 105 and the catalyst chamber 107 are separated from each other. A second U-shaped wall member 131 having legs 133 and 135 and an arcuate shaped portion 137 is provided with the legs 133 and 135 being located against the outward portions of the legs 109 and 111 and with their edges 133A and 135A secured to the edges 103A and 103B of the outer wall member 103 such that the outer portion of the U-shaped member 131 including the arcuate shaped wall portion 137 extends outward of the wall portion 137 forming a collection chamber 139.

A top wall 141 comprising an annular wall portion 143 and an outward extending portion 145 is coupled to the upper ends of the wall members 101 and 103 and 107 and 131 and a bottom wall 151 comprising an annular wall portion 153 and an outward extending portion 155 is coupled to the lower ends of the wall members 101 and 103 and 107 and 131 to effectively seal the heat insulation chamber 105 from the catalyst chamber 115 and the collection chamber 139 and all of the chambers 105, 115, and 139 from the atmosphere. The outward extending portion 145 of the top wall 141 has an aperture 161 formed therethrough with a vertical wall 163 extending around the aperture and upward from the top portion of the wall portion 145 such that the aperture 161 is in fluid communication with both the catalyst chamber 115 and the collection chamber 139. A removable lid 165 is adapted to fit over the wall 163 and hence over the opening 161 and to be secured to the top wall 141 with bolts 167.

An exhaust port or opening 171 is formed through the wall portion 173 of the U-shaped member 131 at its lower end midway between its side walls 133 and 135. An exhaust tube 173 is located in the aperture 171 and an outlet chamber 181 has an inlet tube 183 located in the tube 173 and an outlet 185 located below the blower 61. A U-shaped baffle 191 has its lower end 192 secured and sealed to the inside of the outward extending portion 155 of the bottom wall 151 and its side legs 193 and 195 secured to the inside of the legs 133 and 135 of the U-shaped member 131. The top 197 of the baffle 191 is lower than the top wall 141 of the chamber member and above the exhaust port 171, 173. Thus, when the blower is operating, the gases from inside of the chamber member 41 and the ash pan 45 pass through the perorations 123, through the heat activated catalyst 81, through the perforations 121, above the top edge 197 of the baffle 191 through the exhaust port 171, 173 and into and through the exhaust chamber 181 by way of its inlet 183 and outlet 185 and then by way of the blower 61 through the exhaust vent 65.

Figure 7:
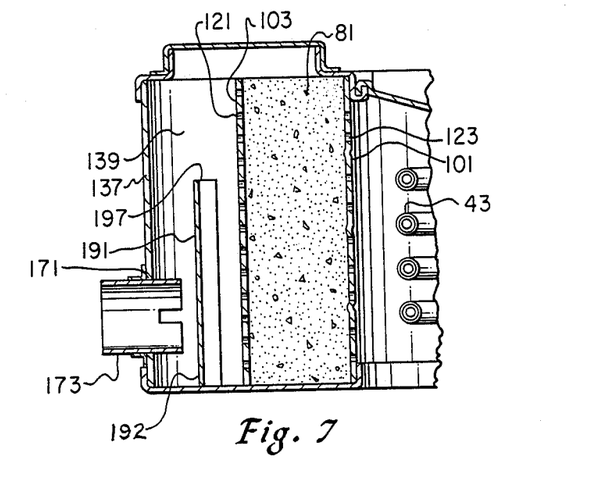
FIG. 7 is a cross sectional view of FIG. 4 taken along the lines 7—7 thereof.

The perforated section of the inner wall 101 has an arc length of about six inches and a height of about three and one-half inches. The height of the arcuate portion 113 also is about three and one-half inches. The distance between the perforated section of the cylindrical wall 101 and the arcuate portion 113 is about two inches such that the catalyst chamber has a total volume of about forty cubic inches. The collection chamber has a thickness from wall 113 to wall 137 is about one and one-quarter inches with an areal extent of six by four or twenty four square inches, having been reduced from ten by four or forty square inches of the earlier versions. Thus, the pressure distribution across the outer face of the perforated catalyst chamber is more nearly equalized because of the greater thickness and smaller area of the catalyst chamber. The catalyst is easily added through the port or opening 161 by removing the cap 163. Alternatively, old or deteriorated catalyst can be vacuumed out through the opening 161 which has dimensions of about one and one-quarter of an inch by four inches which is adequate for the nozzle of the ordinary home vacuum. Dust from the powdered catalyst generally accumulates in the lower portion of the catalyst chamber or container and is carried into the collection chamber along its lower level. The metal plate or baffle 191 is located midway between the walls 113 and 137 of the collection chamber and extends upward to a position about two thirds of the height of the collection chamber. The baffle 191 is sealed to the bottom 155 of the collection chamber. The baffle 191 thus causes dust to drop out and to be collected in the bottom in front of the baffle whereby the dust is prevented from entering the blower and depositing on the blower impeller. The collected dust can be vacuumed out from time to time.

Only a small portion of air drawn into the toilet goes into the incinerator chamber - only enough to permit complete incineration of the waste. Approximately ninety-five percent of the intake air traverses the space about the incinerator chamber thereby carrying away heat from the exterior incinerator wall.

Figures 8, 9:
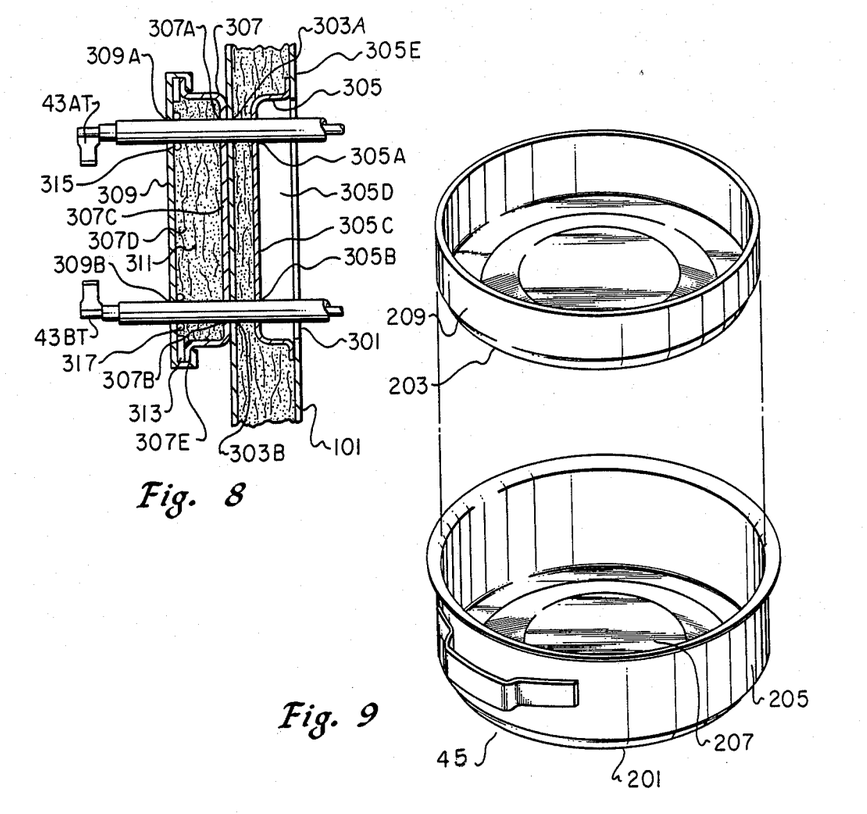
FIG. 8 is a cross sectional view of FIG. 4 taken along the lines 8—8 thereof.
FIG. 9 is an exploded view of the removable ash pan employed in the toilet of FIG. 1.
Figure 10:
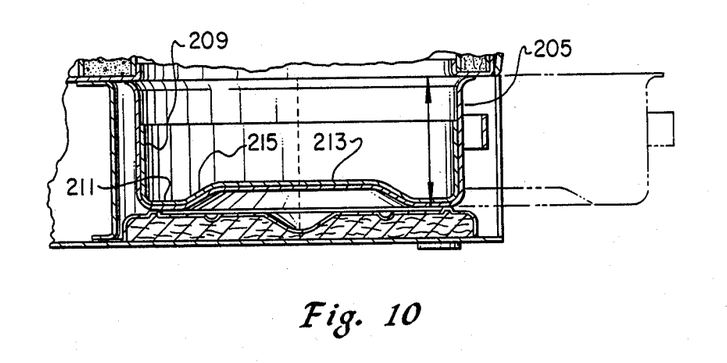
FIG. 10 is a partial cross sectional side view of the toilet of FIG. 1 illustrating that the ash pan is removable.

Referring to FIGS. 9 and 10, the ash pan 45 is a composite ash pan formed by an outer pan 201 of stainless steel and an inner or insert pan 203 of aluminum which is removably inserted within the outer pan 201. The pan 45 is readily removed for emptying or replacement when needed at an inconsequential cost because of its simplicity of manufacture. The center portion of the inner pan 203 may be raised to close proximity to the heater 43 and yet readily conducts gathered heat to its lower portion for increased rate of evaporation of liquids accumulated in the bottom portion. In other words, the aluminum conducts heat into a portion not directly exposed to the radiant heat of the heater 43 itself. The outer pan 201 comprises an outer annular side wall 205 and a bottom wall 207. The inner pan 203 comprises an annular surrounding side wall 209, an annular lower wall portion 211 extending inwardly from the lower end of the annular surrounding side wall 209, and a raised portion 213 spaced inwardly of the annular surrounding side wall 209. The raised central portion comprises an annular inner side wall 215 extending upwardly from the annular lower all portion 211 such that the annular inner side wall 215 is spaced from the annular surrounding side wall 209 with the raised portion 213 forming an upper platform connected to the upper end of the annular inner side wall 215. In the embodiment of FIGS. 9 and 10, the lower portion of the outer pan 201 is shaped similar to the lower portion of the inner pan 203 whereby the lower portion of the inner surface of the outer pan 201 and the outer surface of the inner pan 203 engage each other when the inner pan is inserted in the outer pan.

Figure 11:
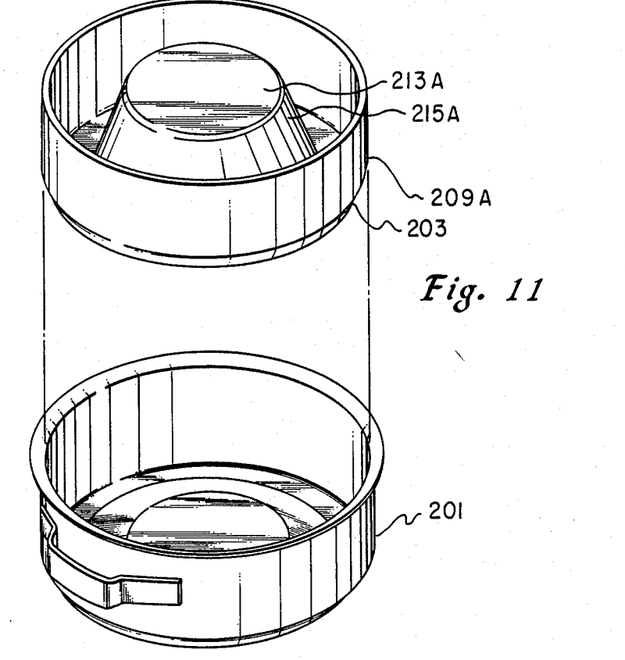
FIG. 11 is an exploded view of another embodiment of the ash pan of the toilet of the invention.
Figure 12:
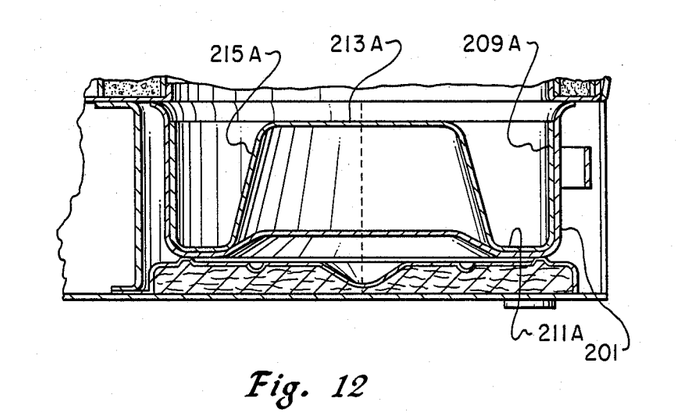
FIG. 12 is a partial cross sectional side view of the toilet of FIG. 1 illustrating the removable ash pan of FIG. 11 located therein.

Referring to FIGS. 11 and 12, the outer pan 201 is the same as that of the outer pan of FIGS. 9 and 10. The inner pan 203 is modified in that its annular wall 209A is higher and the annular inner wall 215 is higher such that the upper wall 213A extends upward to about the same height as the upper edge of the wall 209A and both the upper wall 213 and the upper edge of the surrounding wall 209A extend to nearly the height of the upper edge of the outer pan 201. The outer surfaces of the walls 215A and 213A do not engage the bottom of the outer pan 201 and are spaced therefrom as shown in FIG. 12. In the embodiment of FIGS. 11 and 12, the platform 213A is raised substantially above the lower portion 211 of the inner pan whereby the solid portion of the human waste is separated from the liquid portion with the solid portion being deposited on the platform 213A and the liquid portion flowing to the lower portion 211A. Thus, the solids deposited on the platform 213A are maintained closer to the heater thereby decreasing the time of incineration and increasing the efficiency and lowering the amount of energy required. The liquids in the bottom portion 211A evaporate rapidly since the aluminum conducts heat into the lower portion 211A which may not be directly exposed to the radiant heat of the heater itself. Since the net or effective volume of the composite pan is reduced by virtue of the raised portion 215A and 213A, the height of the wall 209A is made approximately the same as that of the raised portion 215A and 213A to effectively increase the volume of the inner pan 203.

In one embodiment, the outer pan 201 is formed of 304 stainless steel. Pan 201 has a height of four inches and the outside diameter of wall 205 is ten inches. The wall thickness of pan 201 is 0.062 of an inch. The inner pan 203 is formed of a drawable aluminum such as 3003H14 aluminum. The wall thickness of the pan 203 is 0.125 of an inch. It is to be understood that the pans 201 and 203 may have different dimensions and formed of different variations of stainless steel and aluminum respectively.

Figures 2, 3, 5, 6:
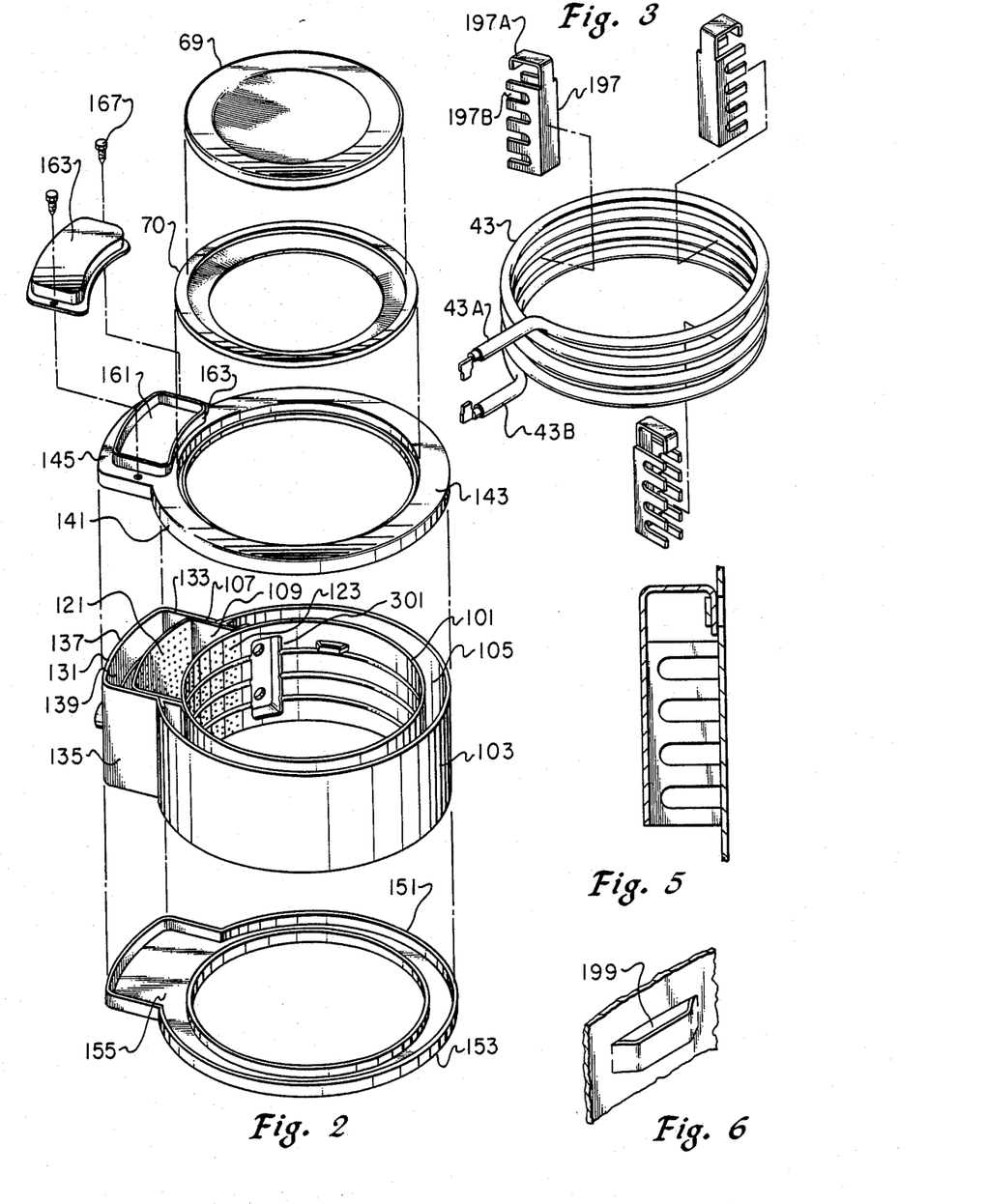
FIG. 2 is an exploded view of an incinerator chamber member of the toilet.
FIG. 3 is an exploded view of the electrical heating coil and its supporting brackets employed in the incinerator chamber member of FIGS. 1 and 2.
FIG. 5 is a side view of one of the brackets employed for securing the electrical coil within the incinerator chamber member.
FIG. 6 illustrates a slot formed in the inner wall of the incinerator chamber member in which the upper hook of the bracket of FIG. 5 may be inserted for holding the bracket in place.

Referring to FIGS. 3, 5, and 6, the arrangement for supporting the electrical heater coil 43 within the chamber 41 comprises three removable brackets 197 having hooks 197A formed at their upper ends. The brackets 197 have slots 197B adapted to receive the turns of the heater coil 43. The hook 197A of the brackets are inserted in slots 199 formed in the inside wall of the cylindrical member 101 for securing the brackets to the inside of the wall 101 while holding and supporting the electrical coil 43. The brackets 197 can be removed from the inner wall 101 to allow the coil 43 to be removed therefrom.

The coil 43 has two terminal ends 43A and 43B. Referring specifically to FIGS. 2 and 8 there will now be described an arrangement for facilitating the insertion of the terminal ends of the coil 43 through the inner and outer walls of the chamber 41 thereby facilitating removal and replacement of the coil for servicing. The terminal ends 43A and 43B have tabs 43AT and 43BT which are removed when the terminal ends are being inserted or removed from the chamber 41. A large rectangular shaped aperture 301 is formed through the inner wall 101 and two spaced apertures 303A and 303B are formed through the outer wall 103 on one side of the catalyst chamber as shown in FIG. 2. When the inner and outer members 101 and 103 are assembled, the apertures 303A and 303B will be in alignment with the large aperture 301. Also provided is an inner cup shaped member or pan 305 and an outer cup shaped member or pan 307. Member 305 has two small apertures 305A and 305B formed in its back end 305C and a large opening 305D surrounded by a flange 305E. The flange 305E is welded to the outer surface of the wall 101 such that the apertures 305A and 305B are in alignment with the apertures 303A and 303B respectively and such that the opening 305D is in alignment with the opening 301. Pan 307 also has two small apertures 307A and 307B formed in its back end 307C and a large opening 307D formed in its front end and surrounded by a flange 307E. Opening 307D is adapted to be closed by a lid 309 which may be attached to the flange 307E as shown in FIG. 8. The back end 307C is welded to the outside surface of the outer wall 103 such that apertures 307A and 307B are in alignment with apertures 303A and 303B. The lid 309 has a pair of small apertures 309A and 309B for receiving the terminal ends 43A and 43B of the coil. Located within the pan 307 is heat insulation material 311 which may be hair-like mineral wool.

When assembling the heater coil in place, the lid 309 will be removed. The heater coil then will be located within the slots 197B of the brackets 197 such that the brackets 197 are located 120° apart. The coil and the brackets then will be tilted as the assembly is inserted in the interior of the chamber 41 to allow the terminal ends 43A and 43B to be inserted through the large aperture 301; through the smaller apertures 305A, 303A, 305B, and 303B, 307A, 307B; and then out through the large opening 307D of the pan 307. The heat insulation 311 then may be inserted within the pan 307 and packed around the terminal ends after which the lid 309 may be inserted in place. Suitable heat resistant flexible seals 313, 317, 315 may be provided to insure minimum of heat loss through the sealing pan 307.

In one embodiment, the walls 101, 103, 107, 131, and 137 and 151 and 141 of the chamber 41 may be formed of suitable mild steel. The heat activated catalyst 81 may be aluminum oxide ($Al_2O_3$) pellets although it is to be understood that other types of heat activated catalyst may be used or mixed with the aluminum oxide. The heat insulation material 106 located in the chamber 105 may be mineral wool.

I claim:
1. An incinerator toilet comprising:
    housing structure,
    incinerator chamber means located in said housing structure and having an upper end and a lower end with a central opening extending therethrough,
    bowl means located above said chamber means,
    a removable pan adapted to be located below said lower end of said chamber means,
    heating means located in said central opening of said chamber means,
    said incinerator means comprising:
        an inner cylindrical shaped side wall,
        a partially cylindrical shaped outer side wall forming an arc greater than 180° spaced from and partially surrounding said inner side wall forming a partially annular insulation holding space therebetween,
        a catalyst chamber having side wall means coupled to said partially cylindrical shaped outer side wall, bridging the gap formed between the two side edges of said partially cylindrical shaped; outer side wall and extending radially outward therefrom defining said catalyst chamber having a radial dimension greater than the radial dimension of said annular insulation holding space,
        perforations formed through said side wall means and through the portion of said inner cylindrical shaped side wall located radially between said side wall means and the axis of said inner cylindrical shaped side wall, top wall means coupled to the upper ends of said inner cylindrical shaped side wall, said, partially cylindrical shaped outer side wall, and said side wall means, bottom wall means coupled to the lower ends of said inner cylindrical shaped side wall, said partially cylindrical shaped outer side wall, and said outer catalyst chamber side wall, heat insulation material located in said partially annular insulation holding space, a heat activated catalyst located in said catalyst chamber, and evacuation means for withdrawing gaseous products of combustion from said central opening of said incinerator chamber means by way of said perforations and said heat activated catalyst.

2. The incinerator toilet of claim 1, comprising:
said side wall means further being coupled between said inner cylindrical shaped wall and said partially cylindrical shaped outer side wall for separating said catalyst chamber from said insulation holding space.

3. The incinerator toilet of claim 1, comprising: collection chamber wall means coupled around said perforations formed through said side wall means forming a gas collection chamber, and an outlet formed through said collection chamber wall means to provide fluid communication from said catalyst chamber to said evacuation means by way of said collection chamber for allowing the withdrawal of gaseous products of combustion from said central opening of said incinerator chamber means by way of said heat activated catalyst and said collection chamber.

4. The incinerator toilet of claim 3, wherein:
said collection chamber wall means comprises collection chamber side wall structure having an upper end and a lower end, top wall means coupled to said upper end of said collection chamber side wall structure, bottom wall means coupled to said lower end of said collection chamber side wall structure, a baffle located in said collection chamber between said collection chamber side wall structure and said side wall means and coupled to said bottom wall means of said collection chamber, said baffle means has an upper end spaced below said top wall means of said collection chamber and above said outlet whereby the flow path through said collection chamber from said catalyst chamber to said outlet extends over the upper end of said baffle.

5. The incinerator toilet of claim 4, wherein:
said top wall means of said catalyst chamber and of said collection chamber comprises a plate means having an opening leading to said catalyst chamber and to said collection chamber, and a cover means adapted to removably fit over said opening.

* * * * *